(12) United States Patent
Paul

(10) Patent No.: US 10,997,415 B2
(45) Date of Patent: May 4, 2021

(54) AUGMENTED REALITY SYSTEM FOR ASSET TRACKING AND VISUALIZATION USING INDOOR POSITIONING SYSTEM

(71) Applicant: General Electric Company, Schenectady, NY (US)

(72) Inventor: Ratnadeep Paul, Cohoes, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/153,377

(22) Filed: Oct. 5, 2018

(65) Prior Publication Data

US 2020/0110934 A1   Apr. 9, 2020

(51) Int. Cl.
| | | |
|---|---|---|
| *G06K 9/00* | (2006.01) | |
| *G01S 13/87* | (2006.01) | |
| *H04W 4/024* | (2018.01) | |
| *H04W 4/33* | (2018.01) | |

(52) U.S. Cl.
CPC ........ *G06K 9/00671* (2013.01); *G01S 13/878* (2013.01); *H04W 4/024* (2018.02); *H04W 4/33* (2018.02)

(58) Field of Classification Search
CPC .................................................. G06K 9/00671
See application file for complete search history.

(56) References Cited

U.S. PATENT DOCUMENTS

| | | |
|---|---|---|
| 8,761,811 B2 | 6/2014 | Alonzo |
| 8,924,548 B2 | 12/2014 | Frost et al. |
| 9,395,195 B2 | 7/2016 | Ihara et al. |
| 9,448,072 B2 | 9/2016 | Bandyopadhyay et al. |
| 9,689,688 B2 | 6/2017 | Sasao et al. |

(Continued)

FOREIGN PATENT DOCUMENTS

CN   107782314 A   3/2018

OTHER PUBLICATIONS

Xu, Jinsong et al., "Design and Implementation of Channel Estimation and Equalization of Indoor Positioning System Based on UWB", 2009 Second International Conference on Intelligent Computation Technology and Automation, China , Oct. 10-11, 2009, DOI: 10.1109/ICICTA.2009.730, (pp. 57-61, 5 total pages).

(Continued)

*Primary Examiner* — Phi Hoang
(74) *Attorney, Agent, or Firm* — Buckley, Maschoff & Talwalkar LLC

(57) ABSTRACT

A method and system to receive an indication of a location of an asset from a tag associated with and adjacent to the asset, the location of the asset being within a known mapping of an indoor environment; receive an indication of a location of an augmented reality device, the indicated location of the asset being within the known mapping of the indoor environment; determine a location of the asset relative to the augmented reality device based on the received information from the asset and the received information from the augmented device; determine contextual directions from the determined location of the augmented reality device to the indicated location of the asset; and present, in a current field of view display on the augmented reality device a combination of a representation of the determined location of the asset and a representation of the determined contextual directions.

18 Claims, 12 Drawing Sheets

(56) References Cited

U.S. PATENT DOCUMENTS

| | | | |
|---|---|---|---|
| 10,212,553 B1* | 2/2019 | Ambha Madhusudhana | ............... H04W 4/027 |
| 2007/0290924 A1* | 12/2007 | McCoy | ............... G01S 5/14 342/464 |
| 2012/0249588 A1 | 10/2012 | Tison et al. | |
| 2016/0140868 A1* | 5/2016 | Lovett | ............... G09B 19/0053 434/118 |
| 2016/0171777 A1 | 6/2016 | Todeschini et al. | |
| 2017/0076504 A1 | 3/2017 | Oar et al. | |
| 2017/0168135 A1* | 6/2017 | Want | ............... G01S 11/16 |
| 2017/0367766 A1* | 12/2017 | Mahfouz | ............ A61B 17/1703 |
| 2018/0131907 A1 | 5/2018 | Schmirler et al. | |
| 2018/0247259 A1* | 8/2018 | Borders | ............... G01S 5/14 |
| 2018/0247421 A1* | 8/2018 | DeAngelis | ......... G06K 9/00342 |
| 2019/0170845 A1* | 6/2019 | Stroiescu | ................ G01S 1/024 |

OTHER PUBLICATIONS

Kuhn, Michael J. et al., "Ultra wideband 3-D Tracking of Multiple Tags for Indoor Positioning in Medical Applications Requiring Millimeter Accuracy", 2012 IEEE Topical Conference on Biomedical Wireless Technologies, Networks, and Sensing Systems (BioWireleSS), USA, Jan. 15-18, 2012, (pp. 57-60, 4 total pages).

Pena-Rios, Anasol et al., "A Fuzzy Logic Based System for Geolocated Augmented Reality Field Service Support", 2017 IEEE International Conference on Fuzzy Systems (FUZZ-IEEE), Italy, Jul. 9-12, 2017, (pp. 1-6, 6 total pages).

* cited by examiner

400

405 RECEIVE AN INDICATION OF A LOCATION OF AN ASSET FROM A TAG ASSOCIATED WITH AND ADJACENT TO THE ASSET

410 RECEIVE AN INDICATION OF A LOCATION OF AN AUGMENTED REALITY DEVICE

415 DETERMINE A LOCATION OF THE ASSET RELATIVE TO THE AUGMENTED REALITY DEVICE BASED ON THE RECEIVED INFORMATION FROM THE ASSET AND THE RECEIVED INFORMATION FROM THE AUGMENTED DEVICE

420 DETERMINE CONTEXTUAL DIRECTIONS FROM THE DETERMINED LOCATION OF THE AUGMENTED REALITY DEVICE TO THE INDICATED LOCATION OF THE ASSET

425 PRESENT, IN A CURRENT FIELD OF VIEW DISPLAY ON THE AUGMENTED REALITY DEVICE, AT LEAST ONE OF (i) A REPRESENTATION OF THE DETERMINED LOCATION OF THE ASSET AND A REPRESENTATION OF THE DETERMINED CONTEXTUAL DIRECTIONS, AND (ii) A REPRESENTATION OF THE DETERMINED CONTEXTUAL DIRECTIONS

*FIG. 4*

AUGMENTED REALITY SYSTEM FOR ASSET TRACKING AND VISUALIZATION USING INDOOR POSITIONING SYSTEM

BACKGROUND

The field of the present disclosure relates generally to an augmented reality system, more particularly, to an augmented reality system integrated with a system that tracks assets.

A number of technological advances have been realized regarding the tracking of assets. In separate technical areas from the tracking of assets, many advances and improvements have been made in the areas of augmented reality (AR). Some of the advances in AR provide mechanisms for a user to partake in enhanced, immersive, and interactive experiences with their environment. A number of such experiences focus on entertainment aspects and outcomes.

In some respects, a need exists for methods and systems that provide an integration of AR systems and devices and asset tracking systems such that an efficient, reliable, and responsive platform including the benefits of both systems may be realized.

BRIEF DESCRIPTION OF THE DRAWINGS

FIG. 4 illustrates a flow diagram for an example process, in accordance with some embodiments;

DETAILED DESCRIPTION

Embodying systems and methods herein relate to an Augmented Reality (AR) system that visualizes asset-related location data in combination with contextual directions relative to the asset and an AR device within a current field of view (FOV) of the AR device. In some embodiments, the AR device might display an indication of the contextual directions to direct a user to the location of the asset, particularly when the asset is not located in the current FOV of the AR device.

In some aspects, the present disclosure relates to an AR system integrated with an indoor positioning system (IPS) that supports and provides mechanisms to dynamically track assets within an environment covered by the IPS and to further visualize the assets in an AR device registered or otherwise associated with the AR system. In some aspects, the methods and systems of the present disclosure provide a visualization of the current, actual relative location of an asset tracked within an IPS in a current FOV of an AR device. In some instances and use-cases, a user of the AR device presented with a display of this combination of visualized information, may be made contextually aware of their current location relative to the tracked assets within their FOV and, in an instance the tracked assets are not within their FOV, be presented with contextual 3D directions from their current location to the tracked assets.

In some embodiments, a system disclosed herein may comprise an AR system and an IPS. Furthermore, the system may include an AR device including a display device/system that is registered to the AR system, an IPS based map of an environment of interest (e.g., a warehouse, factory, office building, or other area/facility covered by the IPS), a tracking system to locate assets within the IPS mapped environment, a system to track the AR device within the IPS mapped environment, a data management system (e.g., a server, a database, and combinations thereof) to store asset-related location information, and a communication network to facilitate and support communication between the IPS, the AR device, and the data management system.

Figure 1:
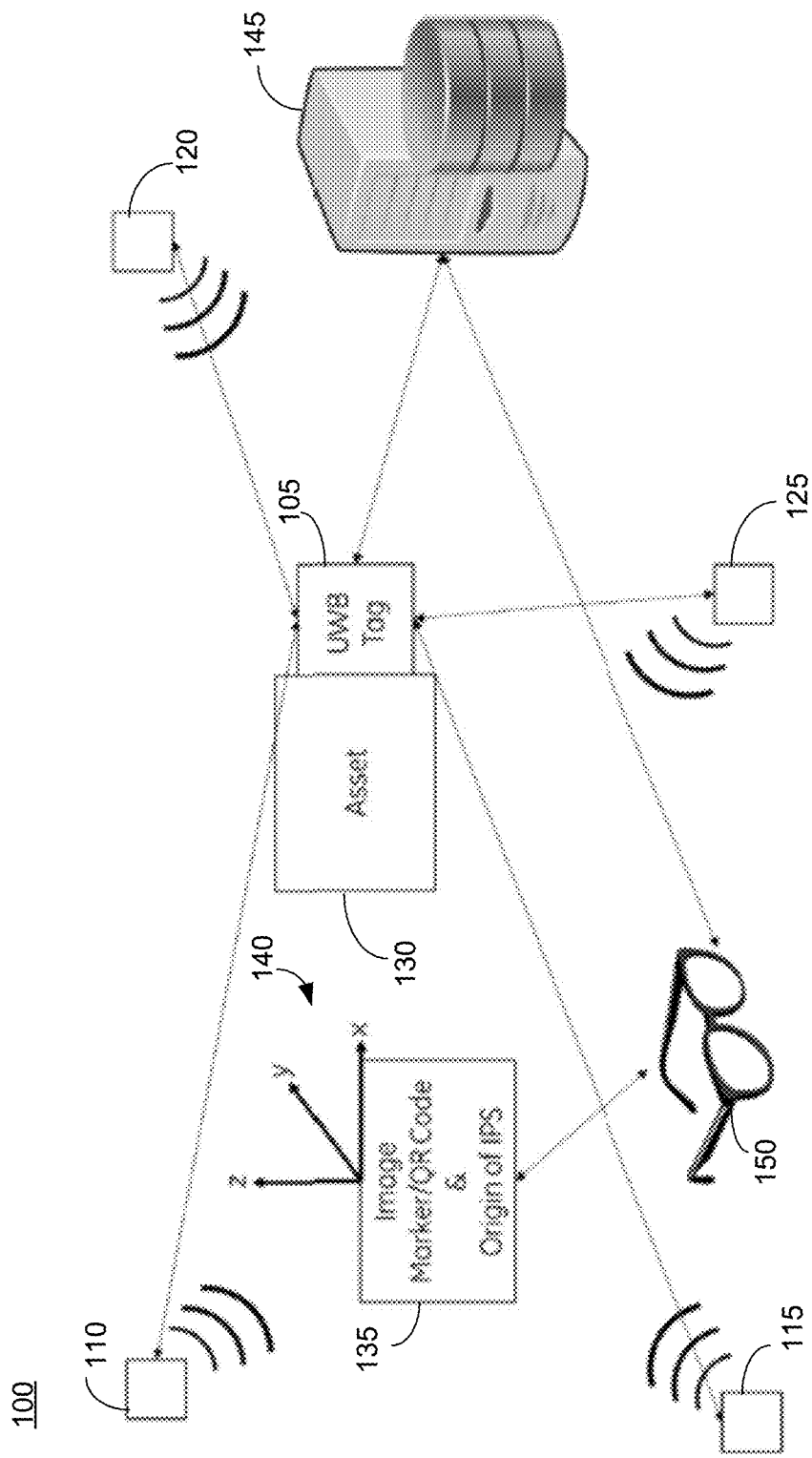
FIG. 1 is an illustrative schematic depiction of an example system, in accordance with some embodiments.

FIG. 1 is an illustrative schematic depiction of an example system 100, in accordance with some embodiments. System 100 includes, in some aspects, an AR system and asset tracking system. In the example embodiment of FIG. 1, system 100 includes a plurality of location beacons 110, 115, 120, and 125. Each location beacon is at a known, fixed location. The location of each location beacon is known with respect to a predetermined coordinate system. The fixed locations may correspond to different infrastructure positions of an environment such as, for example, a wall, a pillar, a support, a door, and other fixtures. System 100 further includes a tag 105. Tag 105 is associated with an asset to be tracked within the environment of system 100. In some aspects, tag 105 is located adjacent to (e.g., physically proximal to, in or on) asset 130. In this manner, knowing a location and orientation of tag 105 equates to knowing the location and orientation of asset 130 itself. In some embodiments, system 100 may include multiple tags, with each tag being associated with and affixed adjacent to an asset and capable of communicating with the plurality of location beacons.

Communication between the plurality of location beacons 110, 115, 120, and 125 and tag 105 may be via a wireless communication protocol. In some embodiments, the communication technology protocol used by location beacons 110, 115, 120, and 125 and tag 105 may be an ultra-wide band (UWB) technology. In some instances, UWB herein refers to technologies that transmit information spread over a large bandwidth (e.g., >500 MHz). Specific characteristics of the UWB communication signals used by the devices disclosed herein may vary.

The location beacons and tag(s) of system 100 may form at least a portion of the IPS of system 100. The plurality of location beacons 110, 115, 120, and 125 (may include fewer or more location beacons but, in some systems, at least n, where n>3) and tag(s) 105 may correspond to and encompass or cover an environment of interest, where each such environment can be fully mapped using the multiple location beacons and tags.

In some embodiments, each asset (e.g., 130) has an associated tag (e.g., 105) and the tag's three-dimensional location (x, y, z) and orientation ($\alpha$, $\beta$, $\gamma$) are calculated using an UWB based radio communication system. In some aspects, UWB technology communication protocols are used herein to achieve centimeter level tracking accuracy that can be useful in tracking and locating assets in a multitude of different scenarios and applications, including but not limited to hospitals, warehouses, factories, powerplants, etc.

A location of a tag 105 in system 100 may be calculated based a determination of a distance between a particular tag and one or more of the location beacons in system 100. The determined location of tag 105 may be transmitted via a UWB signal to server 145. Data management system or server 145 may be implemented as a central server and/or database, a distributed server and/or database, and a cloud-based service.

An image marker 135 is physically included in system 100 at an origin of a coordinate system 140. Image marker 135 may be a visual image configured according to a design specification to include information, where the information may be coded per the design specification to convey, for example, an orientation of the image marker, a location of the image marker, a reference to other information, and other data. Image marker 135 may be a barcode, a Quick Response (QR) code, and other machine-readable two-dimension labelling schemes. Image marker 135 has its own coordinate system, as illustrated at 140. in some embodiments, coordinate system 140 includes a positive x-axis along a longer axis of the image marker, a positive y-axis along a shorter axis of the image marker, and a z-axis that is orthonormal to the plane of the image marker. In some aspects, the coordinate system of the IPS comprising the location beacons 110, 115, 120, and 125 and tag(s) 105 is aligned with the coordinate system 140 of the image marker by virtue of the image marker being physically located or attached to the origin of the IPS coordinate system.

In some aspects, image marker 135 may be optically scanned by AR device 150. In some embodiments, AR device 150 includes an image capture device/system (e.g., a camera) to optically scan image marker 135. The AR system's coordinate system or universe may be aligned with the marker coordinate system 140 by scanning image marker 135 by AR device 150.

In some respects, since the image marker coordinate system 140 is aligned with the IPS coordinate system by virtue of the image marker being positioned at the origin of the IPS' known coordinate system, the AR system's coordinate system is also aligned with the IPS' coordinate system. That is, the AR system's and the IPS' coordinate systems may be aligned with each other when configured as disclosed herein. With both the AR system and the IPS being referenced to the same coordinate system, the locations of the tag(s) 105 calculated by the UWB IPS of system 100 may be aligned and coordinated with the AR system of system 100 that includes AR device 150. Accordingly, the locations of tag(s) 105 and the asset(s) 130 associated with and affixed adjacent to the tag(s) herein may be accurately represented and included in a field of view of AR device 150. In this manner, a consolidated FOV might be displayed by AR device 150 that includes the AR device's actual, current FOV and the assets (e.g., 130) tracked in the environment of system 100 as they come into view within the current FOV.

In some aspects, server 145 may maintain and manage a searchable database including, for example, of all the tags of system 100, as well as their associated assets and the locations of those assets where the location for each location may be continually updated. In some aspects, the database of server 145 may be queried (e.g., via a voice or text search submitted by a user of AR device 150) for any asset's location maintained and updated in the database.

In some aspects, a tag 105 associated with an asset 130 herein may operate to communicate with the location beacons 110, 115, 120, and 125 in its environment (e.g., hospital, warehouse, factory, school, etc.), calculate its own position based on its relative distances from the plurality of location beacons, and further communicate its position to a server (e.g., 145) which can relay such information to the AR device 150 when the server is queried by the AR device.

In some aspects, after an asset's location is determined, the AR device's display presents visual cues overlaid on the display of an actual object(s) within the FOV of the user. In the instance the object is outside the FOV of the AR device/user, then the system may provide visual cues and/or directions from the AR device/user' current location to the location of the asset on the AR device (e.g., a visor, headset, helmet, glasses, etc.) guide the user to the asset.

In some embodiments, the determined location and orientation of the assets may be live streamed to one or more (i.e., multiple) AR device via a server that delivers the location and orientation information within the FOV of the user. In some respects, system 100 provides a mechanism and platform for a user of AR device 150 to query the current location of an asset using a combination of voice, text and gesture commands, as supported by AR device 150 and the search capabilities of server 145. In some aspects, system 100 including integrated AR system aspects and asset system tracking features provides the technical benefits of, for example, quickly and accurately locating and tracking high cost and/or critical item assets. Such benefits provided by the technical systems and methods disclosed herein might contribute to fewer lost items, reductions in the cycle time to locate items, increased productivity and efficiency, and other advantages.

Figure 2:
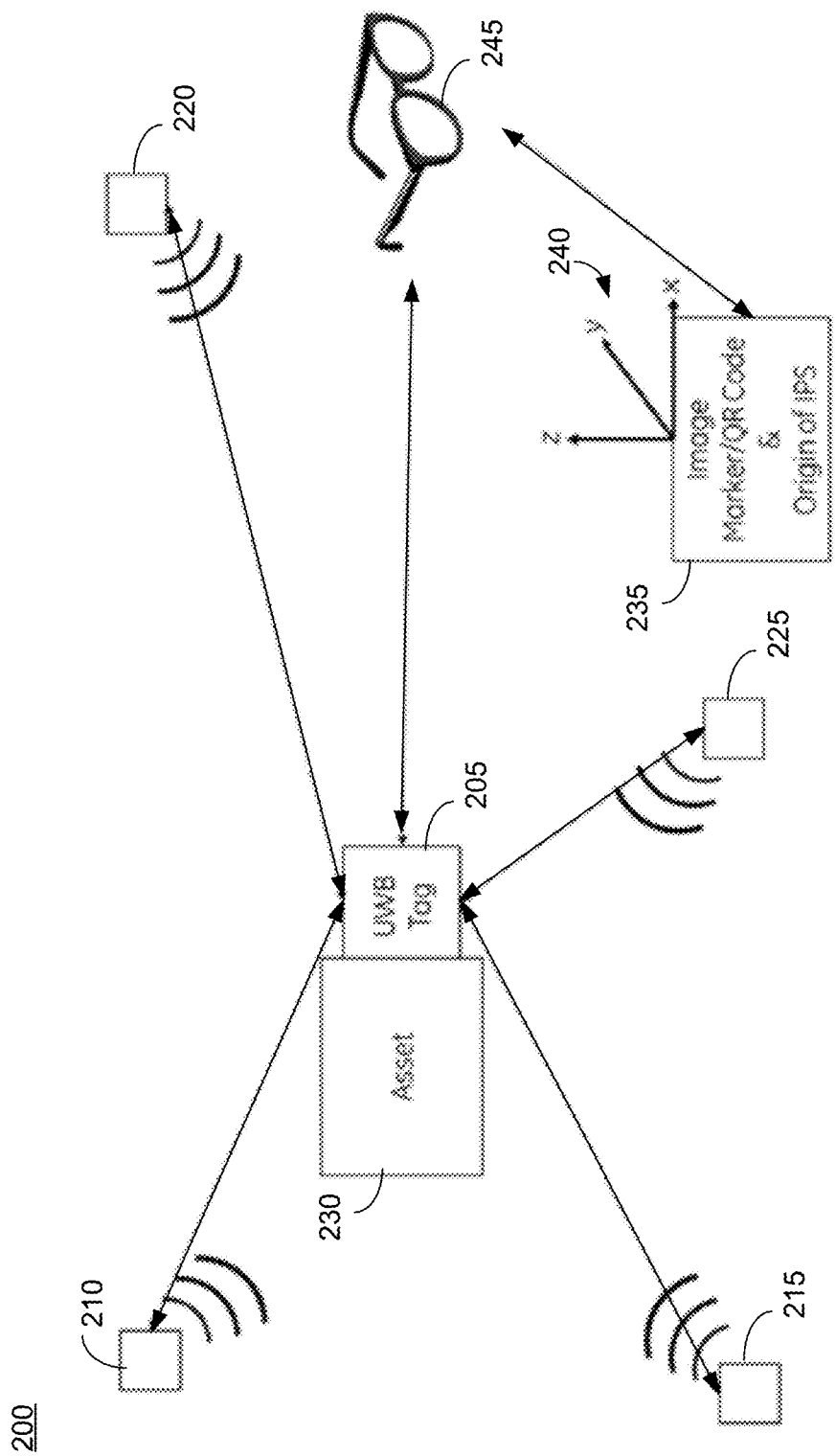
FIG. 2 is an illustrative schematic depiction of an example system, in accordance with some embodiments.

FIG. 2 is an illustrative schematic depiction of an example system 200, in accordance with some embodiments. System 200 may be similar in many aspects to system 100 disclosed in FIG. 1. However, FIG. 2 departs from FIG. 1 since system 200 does not include a server 145. Instead of a server 145 (e.g., a central server and/or database), an AR system including AR device 245 may perform the functions described above in connection with server 145. That is, the functions disclosed in the description of FIG. 1 as being performed by server 145 may instead be performed by AR device 245 in FIG. 2. In some aspects, AR device 245 may include the requisite processing, communication, and memory resources to implement the functions disclosed previously as being performed by server 145. Given the detailed description above of server 145 and the functions performed thereby, a repeat of the same functions and descriptions is not included here but an understanding of the functionality of AR device 245 can be had by referring to the description of server 145.

Further regarding system 200, system 200 includes a plurality of beacon locations 210, 215, 220, and 225 that function similar to location beacons 110, 115, 120, and 125; a location tag 205 that operates similar to tag 105; an asset 230 similar to asset 130; an image marker 235 similar to image marker 135; and an image marker coordinate system 240 similar image marker coordinate system 140. As such, system 200 operates and provides many of the same or similar functions and benefits as system 100, except AR device 245 also performs the functions previously reserved for server 145 in system 100.

In some aspects, system 100 provides some technical benefit(s) by having AR device 245 onboard the functionalities of server 145, including, for example, a more compact system (fewer components) and not having to have a separate (e.g., central) storage facility to store asset-related location data. In this scenario, queries submitted by a user may be processed by AR device 245. In some embodiments, system 100 may be used in an instance where multiple AR devices are deployed. However, system 200 might also be implemented in some instances with multiple AR device, wherein the AR devices might directly communicate with each other.

Figure 3:
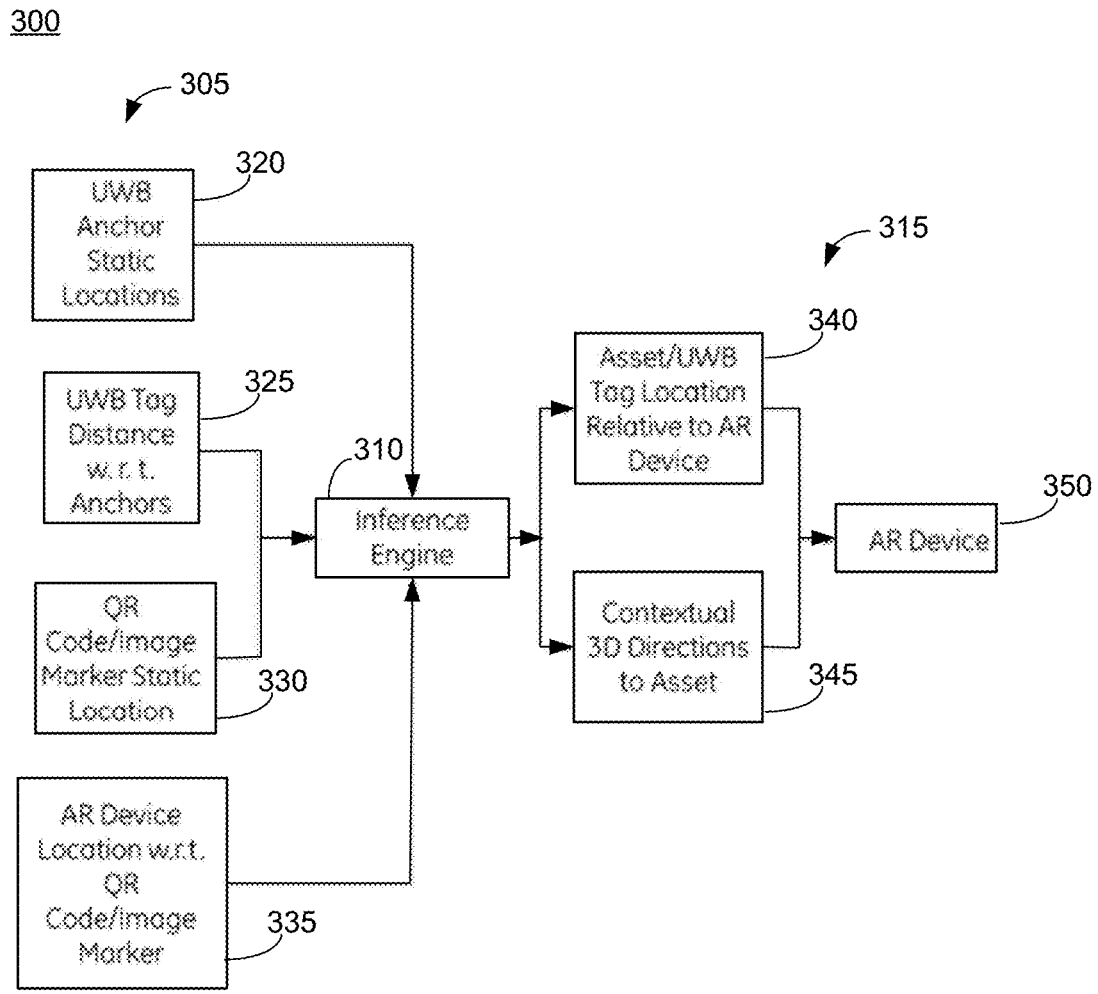
FIG. 3 is an illustrative block diagram of an example system architecture or platform, in accordance with some embodiments.
Figure 5:
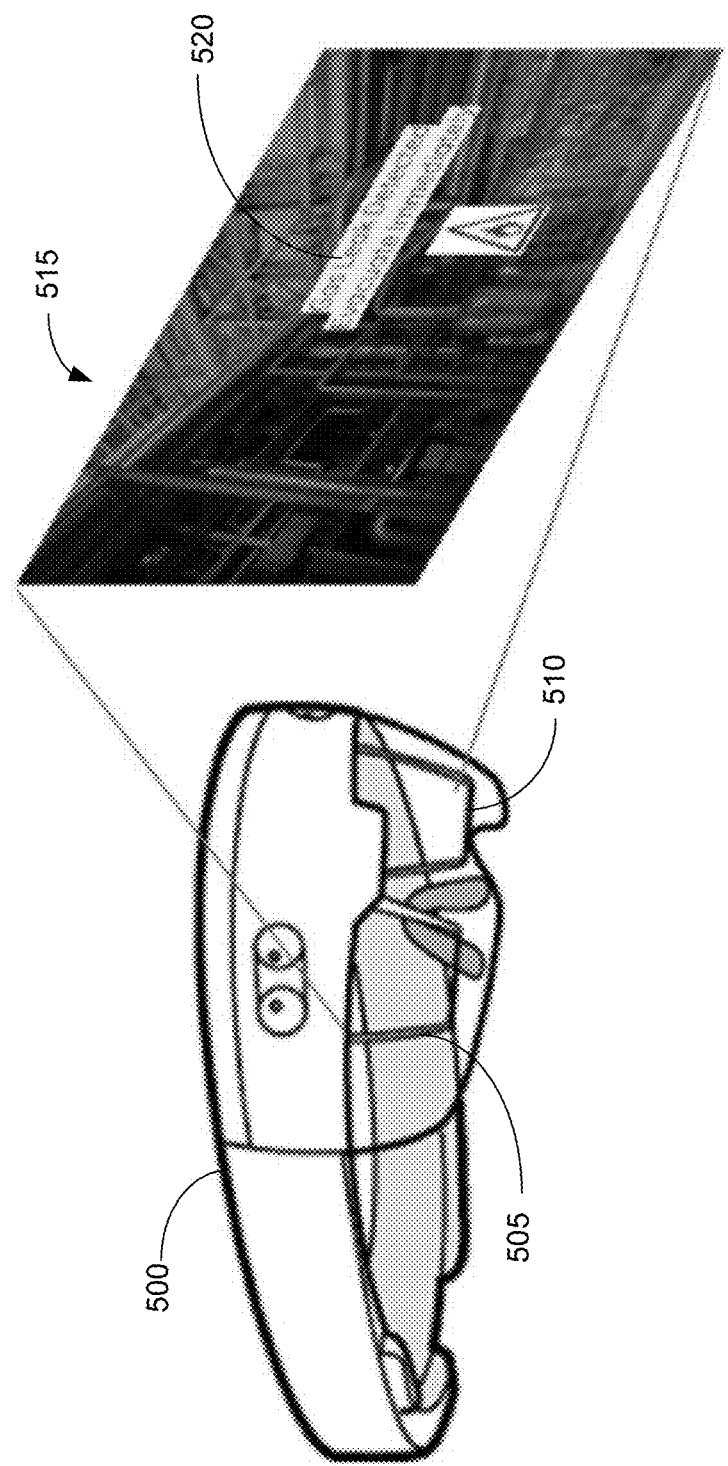
FIG. 5 illustrates an example of augmented reality device system, in accordance with some embodiments.

FIG. 3 is an illustrative schematic diagram 300 of an example AR system integrated with an IPS tracking assets, in accordance with some embodiments herein. In some aspects, system 300 includes a number of inputs 305 from one or more location beacons, tags, image marker(s), and AR devices that may be processed by a processor-based inference engine 310 to produce a number of outputs 315 that may be displayed on a AR device 350. In one embodiment, system 300 produces or otherwise generates a consolidated FOV including a combination of visualizations of a location of an asset being tracked and contextual directions to the asset.

Referring to FIG. 3, system 300 receives multiple different inputs. In some embodiments, additional types of inputs might be received and processed by system 300. Input 320 is received from one or more (UWB) location beacons, and includes information indicative of a location of the beacon's location. In some aspects, this location information can include 3D coordinate information for each beacon, where the beacons are each located at a fixed position. Since the position of each location beacon is fixed (i.e., static), input 320 may need to be received once for each beacon, so long as the position of the location beacon is not disturbed. In some embodiments, input 320 may be received periodically.

Input 325 includes (UWB) information indicative of a distance of a tag (e.g., 105, 205) relative to the one or more location beacons referenced in input 320. The relative distance of each tag from multiple different location beacons can be used to accurately determine the location of the tag, and by association, an asset located coincident with a particular tag. In some embodiments, input 325 may be continually (or at least periodically) updated so as to provide an accurate basis for the calculation of a current or real-time location for an asset associated with a tag herein.

Input 330 includes information indicative of a location of an image marker. Since the image marker is physically and statically located at the origin of an IPS as disclosed herein, input 330 may only need to be received once, so long as the position of the image marker is unchanged. In some embodiments, input 330 may be received periodically.

Input 335 includes information indicative of a location of an AR device in a system herein. The location of the AR device may be referenced to the image marker of input 330, as discussed hereinabove. In some embodiments, input 335 may be continually (or at least periodically) updated so as to provide a current or real-time location for an AR device herein.

In some aspects, the inputs 320, 325, 330, and 335 may be transmitted to inference engine 310. In some embodiments, inference engine 310 might include artificial intelligence (AI) aspects, such as machine learning, artificial neural networks, statistical learning, and other techniques. In some aspects, inference engine 310 may use one or more predetermined rules, lookup tables, and other stored data references to process inputs 305 to produce outputs 315. In some instances, inference engine 310 might use a combination of AI aspects and one or more other techniques in processing inputs 305. Operationally, inference engine 310 processes inputs 305 to determine and generate outputs 315. Outputs 315 might include the two outputs shown in FIG. 3, including, for example, an asset's/tag's location relative to an AR device 340 and contextual directions (e.g., 3D direction) from the AR device's, current location to the asset referenced in output 340. In some embodiments, inference engine 310 may be implemented in a server (shown in FIG. 1) and implemented in an AR device (illustrated in FIG. 2 by the absence of a server and as disclosed hereinabove) configured to, for example, receive inputs 305 and generate outputs 315 that are transmitted or otherwise communicated to or produced by an AR device herein. The server or AR device may include a memory and a processor cooperatively operating to execute program instructions to process inputs 305 to produce outputs 315.

In some embodiments, inference engine 310 (or the functions thereof) may be embodied in AR device 350, where AR device 350 includes sufficient processing power and memory (if needed) to execute the functions disclosed herein as being performed by inference engine 310. That is, in some embodiments, inference engine 310 may be integrated into or at least functionally be performed, at least in part, by AR device 350.

In some embodiments, a combination of an asset's location and contextual directions from the AR device's current location to an asset may be included in a consolidated FOV of an AR device display. In some instances, the FOV may include both a representation of the asset's determined location and a representation of the contextual directions when the FOV includes a view of the asset's current location. In an instance the asset is not (yet) in the AR device's FOV, then the AR device's display of the FOV might include the contextual direction to the asset, without a representation of the asset since the asset in not (yet) in the FOV.

In some embodiments, inference engine 310 can be implemented by a remotely located central or distributed server system or integrated with the AR device 350. In some embodiments including a remotely located inference engine, the inputs from a location beacon and/or tag may be communicated wirelessly (e.g., UWB) to a central (or distributed) computing and database server. In this scenario, inference engine 310 calculates the outputs and sends the determined outputs to an AR device 350 where the determined outputs may be displayed in a current, contemporaneous consolidated field of vision (FOV) of the user with respect to the AR device. In an embodiment including an inference engine incorporated into an AR device, the inputs from location beacons and tags may be communicated wirelessly (e.g., UWB) to the AR device, where the AR device processes the location and other information with its known location. In this scenario, inference engine 310, as implemented in the AR device, calculates and displays the outputs in a current, contemporaneous consolidated FOV of the user with respect to the AR device.

FIG. 4 is a flow diagram of an example process 400, in some embodiments herein. Process 400 might relate to a system (e.g., 100, 200), platform, or architecture as illustrated in, for example, FIG. 3. At operation 405, information indicative of a location of an asset is received from a tag associated with and adjacent to the asset. Being adjacent to the asset, the information received at operation 405 may be interpreted as being indicative of the location of the asset itself.

At operation 410, an indication of a location of an AR device associated with or otherwise registered with a system to produce visualization(s) related to the tracked asset(s) as determined based on the tag locations referenced in operation 405 may be received. The location information might include 3D coordinate information with respect to the same coordinate system defining the location of the tag.

At operation 415, a location of the tracked asset is determined relative to the AR device, based on the asset location information and AR device location information received at operations 410 and 415, respectively.

Proceeding to operation 420, a determination of contextual directions from the determined location of the AR device to the indicated location of the tracked asset is performed. The contextual directions may be continually updated as a location of the AR device changes as a wearer or user of the AR device changes.

Continuing to operation 430, a consolidated current FOV display on the AR device is presented that includes, at least one of (i) a representation of the determined location of the asset and a representation of the determined contextual directions, and (ii) a representation of the determined contextual directions. In some aspects, the displayed FOV will include aspect (i) when the asset is within the AR device's FOV but the AR device (user) is not directly on or next to the asset. In some aspects, the displayed FOV will include aspect (ii) when the asset is not (yet) within the AR device's FOV.

FIGS. 5-9 each include example depictions of an AR device, in some different embodiments. For example, FIG. 5 includes an illustrative depiction of an AR device including a visor 500 to be worn about the head of a person/user. Visor 500 includes display lenses/screens 505 and 510 on(to) which visualizations may be projected and/or generated to produce a binocular view visualization 515 that includes a FOV 520 of the user at a current location of the AR device 500.

Figure 6:
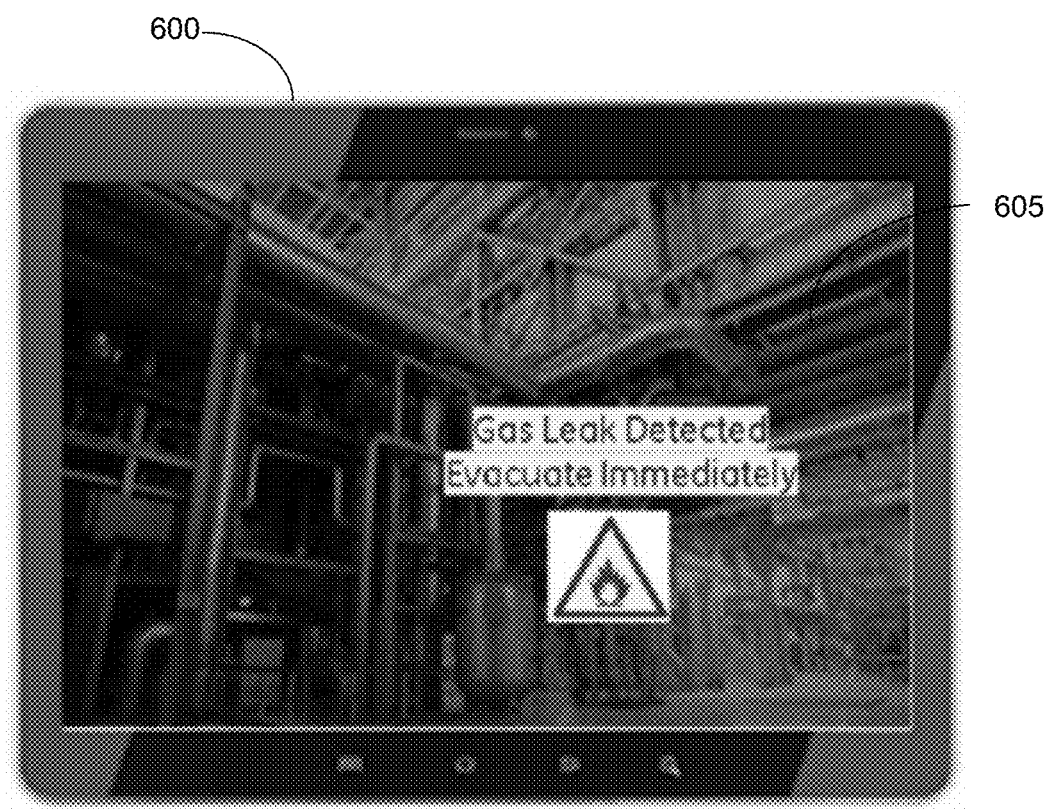
FIG. 6 illustrates another example of augmented reality device system, in accordance with some embodiments.

As another example, FIG. 6 includes an illustrative depiction of an AR device embodying a portable/mobile tablet 600 that might be carried or otherwise transported by a person/user. Tablet 600 includes display on which visualizations may be presented, including a FOV 605 of the user at a current location of the AR device 600 as acquired by one or more cameras on tablet 600 (not shown in FIG. 6).

Figure 7:
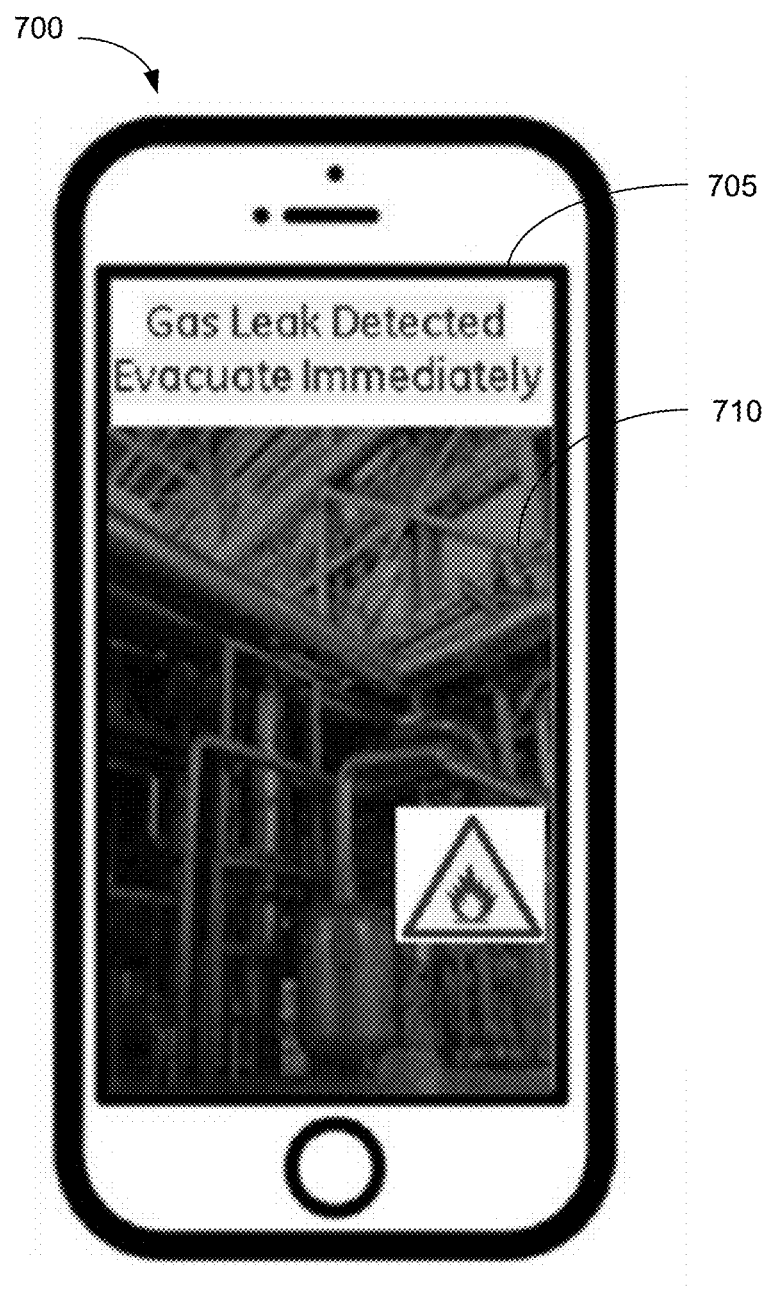
FIG. 7 illustrates yet another example of augmented reality device system, in accordance with some embodiments.

FIG. 7 includes an illustrative depiction of an AR device including a mobile phone 700 that may be carried by a person or user of the mobile phone. Phone 700 includes a display screen 705 in which visualizations may be presented. The screen depicted in FIG. 7 includes a FOV 710 generated based on images and/or video acquired by one or more cameras (not shown in FIG. 7) of the mobile phone at a current location of the phone.

Figure 8:
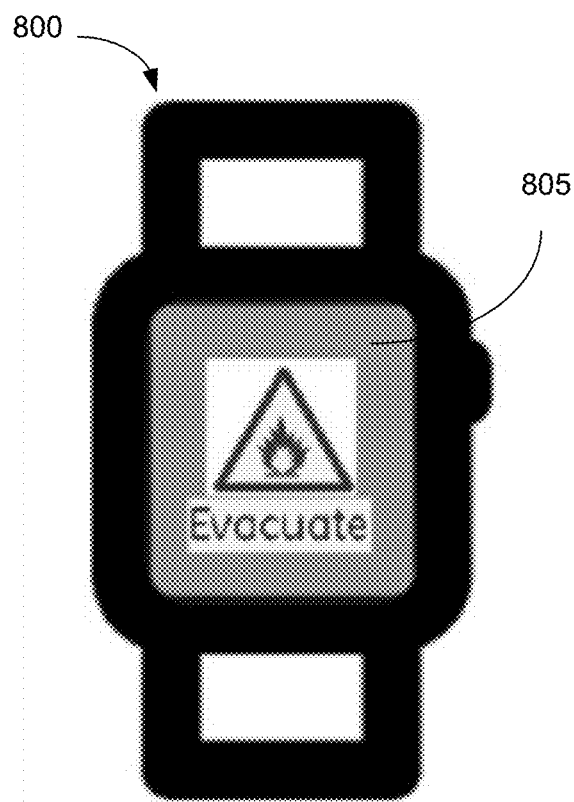
FIG. 8 illustrates an example of augmented reality device system, in accordance with some embodiments.

FIG. 8 includes an illustrative example depiction of an AR device including a "smartwatch" 800 that may be worn by a person or user thereof. Smartwatch 800 includes a display screen 805 in which visualizations may be presented. In some regards, aspects of the visualizations in FIG. 8 may be automatically adjusted based on the size of display screen 805, as compared to other AR device screens. Such adjustments might include a level of detail included in a visualization and/or the manner in which a visualization is effectuated (e.g., static display versus a scrolling display, etc.).

Figure 9:
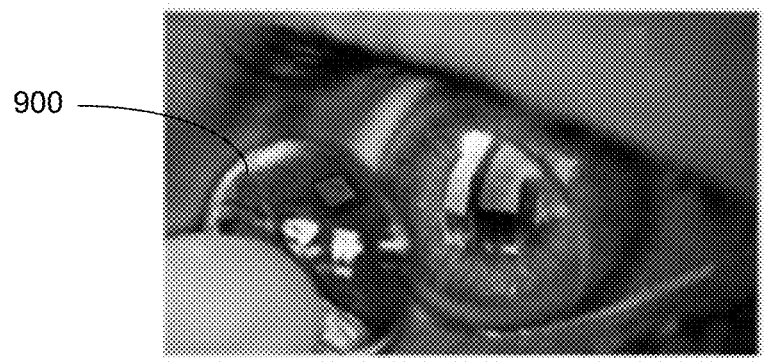
FIG. 9 illustrates still another example of augmented reality device system, in accordance with some embodiments.

FIG. 9 includes an illustrative depiction of an implant-type of AR device, where the example of FIG. 9 is a contact lens that can selectively display visualizations to a wearer thereof. In some embodiments, the visualizations presented in/on contact lens 900 may include one or more of the visualizations types disclosed herein.

Figure 10:
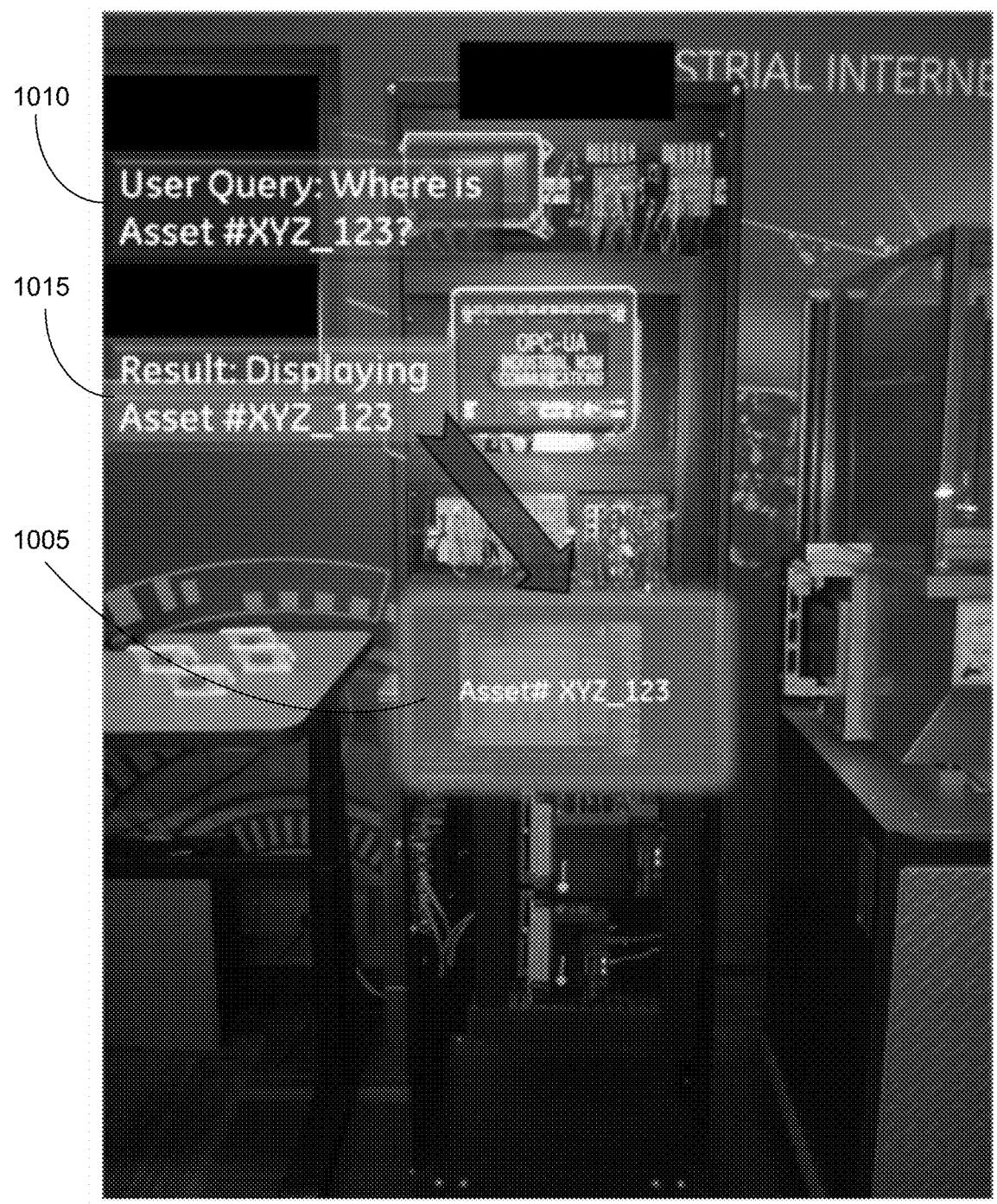
FIG. 10 illustrates an example of a field of view of an augmented reality device system including a display of an asset, in accordance with some embodiments.

FIG. 10 is an illustrative example of a FOV 1000 presented on an AR device system in the possession of a user, in accordance with some embodiments. FOV 1000 includes a visualization of the room in which the user wearing the AR device is located. FOV 1000 includes a graphical representation 1005 indicating a location of an asset (e.g., "Asset #XYZ_123). This is a type of display that might be presented to a user on an AR device when the asset is within the AR device's FOV. Also shown is a query 1010 submitted by the user and the result 1015 resulting from an execution of that query.

Figure 11:
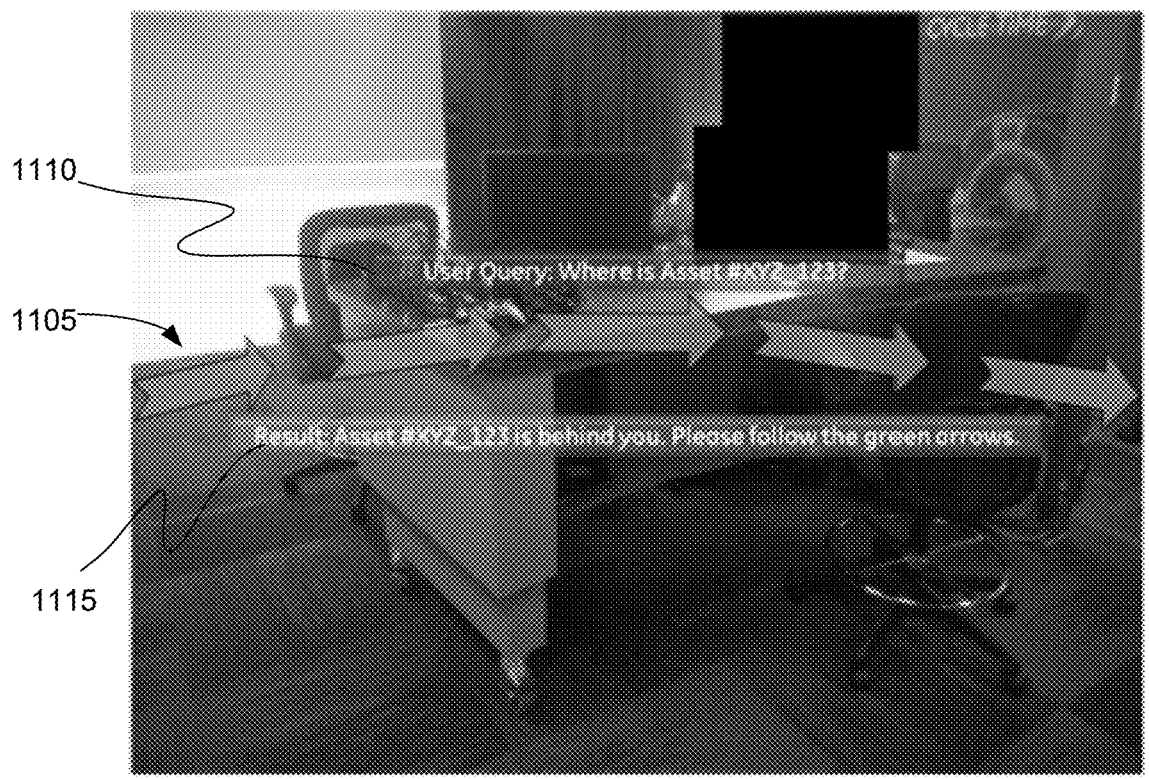
FIG. 11 illustrates an example of a field of view of an augmented reality device system including a display of directions to an asset, in accordance with some embodiments.

FIG. 11 illustrates an example of a FOV 1100 presented on an AR device in the possession of a user, in accordance with some embodiments. FOV 1100 includes a visualization of the room in which the user wearing the AR device is located. FOV 1100 includes a graphical representation 1105 indicating a direction the user should travel in order to reach the location of the asset of interest (e.g., "Asset #XYZ_123). As shown, the directions 1105 include contextual information to inform the user where the asset is in relation to their current FOV (e.g., "behind you"). This is a type of display that might be presented to a user on an AR device when the asset is not within the AR device's FOV but is in the same room as the user. Also shown is a query 1110 submitted by the user and the result 1115 for that query.

Figure 12:
FIG. 12 illustrates an example of field of view of an augmented reality device system including a display of directions to an asset not in the field of view, in accordance with some embodiments.

FIG. 12 is an illustrative example of a FOV 1200 presented on an AR device system in the possession of a user, in accordance with some embodiments. FOV 1200 includes a visualization of the room in which the user wearing the AR device is located. FOV 1200 includes a graphical representation 1205 indicating directions to a location of an asset (e.g., "Asset #XYZ_123). This is a type of display that might be presented to a user on an AR device when the asset is neither within the AR device's FOV nor in the same room as the user/AR device. Also shown is a query 1210 submitted by the user and the result 1215 for that query.

Figure 13:
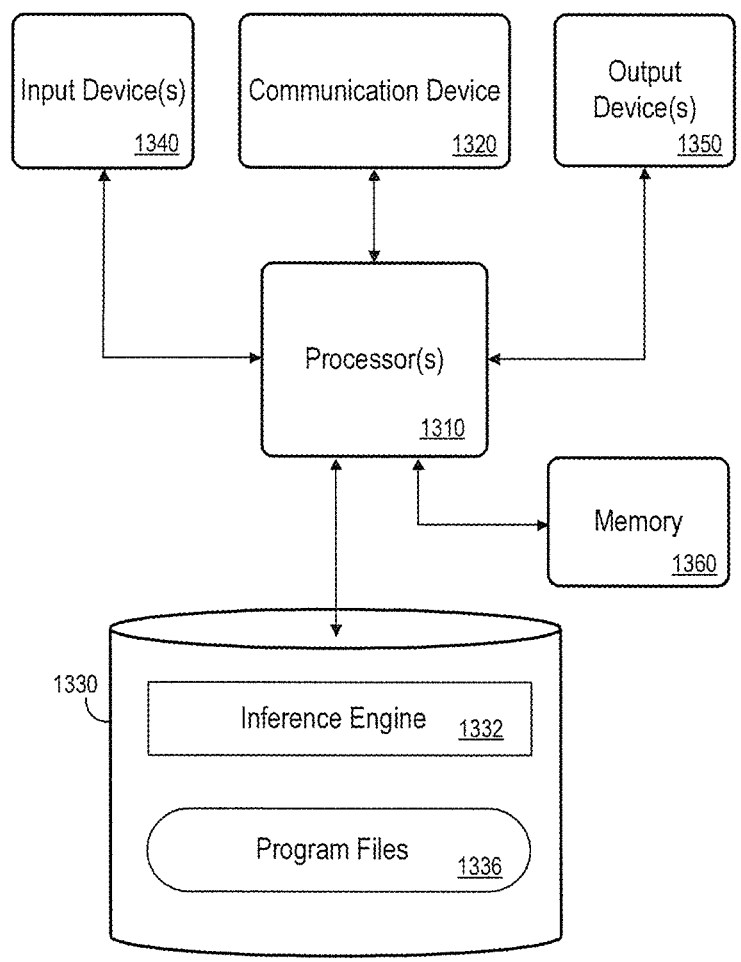
FIG. 13 illustrates a schematic diagram of a system, in accordance with some embodiments.

FIG. 13 is a block diagram of computing system 1300 according to some embodiments. System 1300 may comprise a general-purpose or special-purpose computing apparatus and may execute program code to perform any of the methods, operations, and functions described herein. System 1300 may comprise an implementation of one or more systems (e.g., system 300, an AR device, etc.) and processes (e.g., 400). System 1300 may include other elements that are not shown, according to some embodiments.

System 1300 includes processor(s) 1310 operatively coupled to communication device 1320, data storage device 1330, one or more input devices 1340, one or more output devices 1350, and memory 1360. Communication device 1320 may facilitate communication with external devices, such as a data server and other data sources. Input device(s) 1340 may comprise, for example, a keyboard, a keypad, a mouse or other pointing device, a microphone, knob or a switch, an infrared (IR) port, a docking station, and/or a touch screen. Input device(s) 1340 may be used, for example, to enter information into system 1300. Output device(s) 1350 may comprise, for example, a display (e.g., a display screen) a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, etc., while memory 1360 may comprise Random Access Memory (RAM), Storage Class Memory (SCM) or any other fast-access memory.

Inference engine 1332 may comprise program code executed by processor(s) 1310 (and within the execution engine) to cause system 1300 to perform any one or more of the processes described herein. Embodiments are not limited to execution by a single apparatus. Data storage device 1330 may also store data and other program code 1336 for providing additional functionality and/or which are necessary for operation of system 1300, such as device drivers, operating system files, etc.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods disclosed herein, such as a method of processing multivariable sensor data, sensor location, and AR device location to generate AR device visualization related to same (i.e., process 400, FIG. 4).

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

What is claimed is:

1. A method comprising:
   receiving, by a processor, an indication of a location and orientation of an asset transmitted by a tag associated with and adjacent to the asset, wherein the tag calculates its own position of location and orientation as the location of the asset based on a calculated distance between the tag and at least one beacon and a known coordinate system, the indicated location of the asset being within a known mapping of an indoor environment;
   receiving, by the processor, an indication of a location of an augmented reality device, the indicated location of the augmented reality device being within the known mapping of the indoor environment;
   determining, by the processor, a location of the asset relative to the augmented reality device based on the received information from the asset and the received information from the augmented device;
   determining, by the processor, contextual directions from the determined location of the augmented reality device to the indicated location of the asset; and
   presenting, in a current field of view display on the augmented reality device, at least one of (i) a representation of the determined location of the asset and a representation of the determined contextual directions, and (ii) a representation of the determined contextual directions.

2. The method of claim 1, wherein the known mapping of the indoor environment is determined based on:
   location information received from a plurality of location beacons, each of the location beacons being positioned at a fixed location relative to the known coordinate system within the indoor environment; and
   location information received from the asset including a distance of the asset's location from the plurality of location beacons within the indoor environment.

3. The method of claim 1, wherein the plurality of location beacons transmit their location and communicate with the tag associated with the asset via an ultra-wideband communication technology protocol.

4. The method of claim 1, wherein the indication of the location of the augmented reality device further comprises an orientation of the augmented reality device.

5. The method of claim 1, wherein the presenting includes, in an instance the asset is located in the current field of view, the representation of the determined location of the asset.

6. The method of claim 1, wherein the presenting includes, in an instance the asset is not located in the current field of view, the representation of the determined location of the asset and the representation of the determined contextual directions.

7. The method of claim 1, wherein the visualization of the determined contextual directions includes at least one of:
   a directional arrow,
   a color-coded indication of a route or direction to travel, and
   a textual description of a route to the determined location of the asset.

8. The method of claim 1, wherein the augmented reality device is one of a headset with a display, visor having a display, an eyewear device having a display, a portable computing device with a display, a wearable device with a display, a device in or on a person, and a mobile phone device with a display device.

9. The method of claim 1, wherein the augmented reality device is collocated with one of a person and an unmanned mobile device.

10. A system comprising:
    a memory storing processor-executable instructions; and
    a processor to execute the processor-executable instructions to cause the system to:
       receive an indication of a location and orientation of an asset transmitted by a tag associated with and adjacent to the asset, wherein the tag calculates its own position of location and orientation as the location of the asset based on a calculated distance between the tag and at least one beacon and a known coordinate system, the indicated location of the asset being within a known mapping of an indoor environment;
       receive an indication of a location of an augmented reality device, the indicated location of the augmented reality device being within the known mapping of the indoor environment;
determine a location of the asset relative to the augmented reality device based on the received information from the asset and the received information from the augmented device;
determine contextual directions from the determined location of the augmented reality device to the indicated location of the asset; and
present, in a current field of view display on the augmented reality device, at least one of (i) a representation of the determined location of the asset and a representation of the determined contextual directions, and (ii) a representation of the determined contextual directions.

11. The system of claim 10, wherein the known mapping of the indoor environment is determined based on:
location information received from a plurality of location beacons, each of the location beacons being positioned at a fixed location relative to the known coordinate system within the indoor environment; and
location information received from the asset including a distance of the asset's location from the plurality of location beacons within the indoor environment.

12. The system of claim 10, wherein the plurality of location beacons transmit their location and communicate with the tag associated with the asset via an ultra-wideband communication technology protocol.

13. The system of claim 10, wherein the indication of the location of the augmented reality device further comprises an orientation of the augmented reality device.

14. The system of claim 10, wherein the presenting includes, in an instance the asset is located in the current field of view, the representation of the determined location of the asset.

15. The system of claim 10, wherein the presenting includes, in an instance the asset is not located in the current field of view, the representation of the determined location of the asset and the representation of the determined contextual directions.

16. The system of claim 10, wherein the visualization of the determined contextual directions includes at least one of a directional arrow, a color-coded indication of a route or direction to travel, and a textual description of a route to the determined location of the asset.

17. The system of claim 10, wherein the augmented reality device is one of a headset with a display, visor having a display, an eyewear device having a display, a portable computing device with a display, a wearable device with a display, a device in or on a person, and a mobile phone device with a display device.

18. The system of claim 10, wherein the augmented reality device is collocated with one of a person and an unmanned mobile device.

* * * * *